United States Patent [19]

Wegener

[11] 4,024,667

[45] May 24, 1977

[54] FISHING REEL AND SUPPORT FOR ARCHERY BOWS

[76] Inventor: Gary R. Wegener, 4618 W. Fairmount, Phoenix, Ariz. 85031

[22] Filed: July 22, 1976

[21] Appl. No.: 707,673

[52] U.S. Cl. .................................. 43/19; 124/24 R; 242/85.1

[51] Int. Cl.² ...................... A01K 91/02; F41B 5/00

[58] Field of Search ............. 242/85.51, 84.5 R, 99; 124/23 R, 24 R; 43/19

[56] References Cited

UNITED STATES PATENTS

| | | | |
|---|---|---|---|
| 2,808,043 | 10/1957 | Lombard | 124/24 R |
| 3,084,467 | 4/1963 | Bromwell | 43/19 |
| 3,129,525 | 4/1964 | Lewis | 124/24 R |
| 3,949,730 | 4/1976 | Schoenberger | 43/19 X |

Primary Examiner—Edward J. McCarthy

[57] ABSTRACT

The disclosure relates to an archery bow fishing reel and mount and particularly to a generally loop shaped or ring shaped mount in which a fishing reel is mounted and which is disposed to dispense line forwardly through a generally loop shaped line guide structure which is surrounded by a buoyant line holding spool; the frame also having a guide adapted to guide line extending from the open forward end of the spool backward to an attachment with an arrow and in shooting position relative to the bow on which the reel supporting frame is mounted; the reel supporting frame adapted to support various types of reels and used for dispensing directly from such a reel through the line guide and through a bore in the aforementioned spool such that line may be dispensed directly in a forward direction from a spinning reel or the like held by said frame and through said spool or whereby the line may be first dispensed from the reel and then wound around the spool preliminary to shooting an arrow with line attached thereto.

8 Claims, 10 Drawing Figures

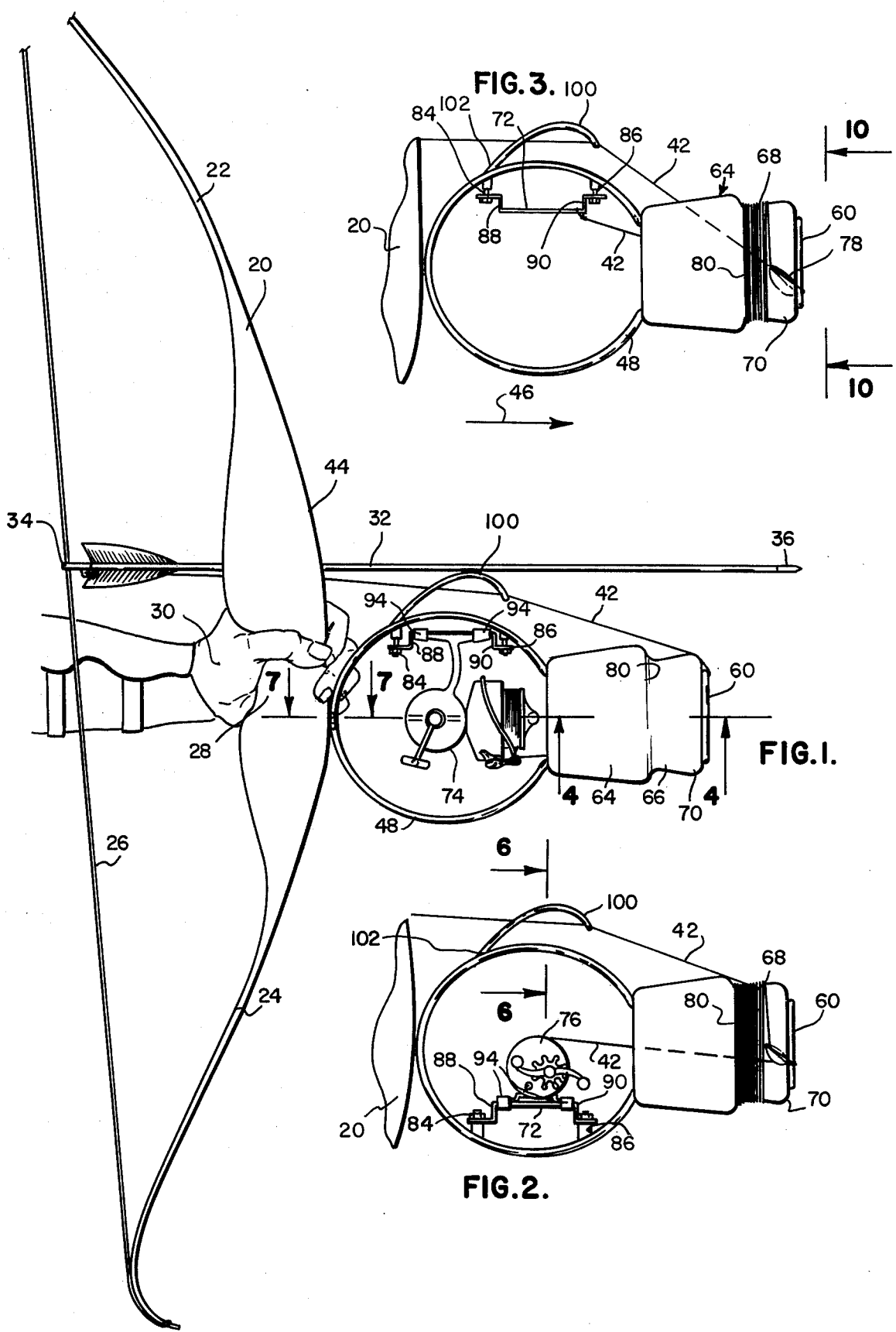

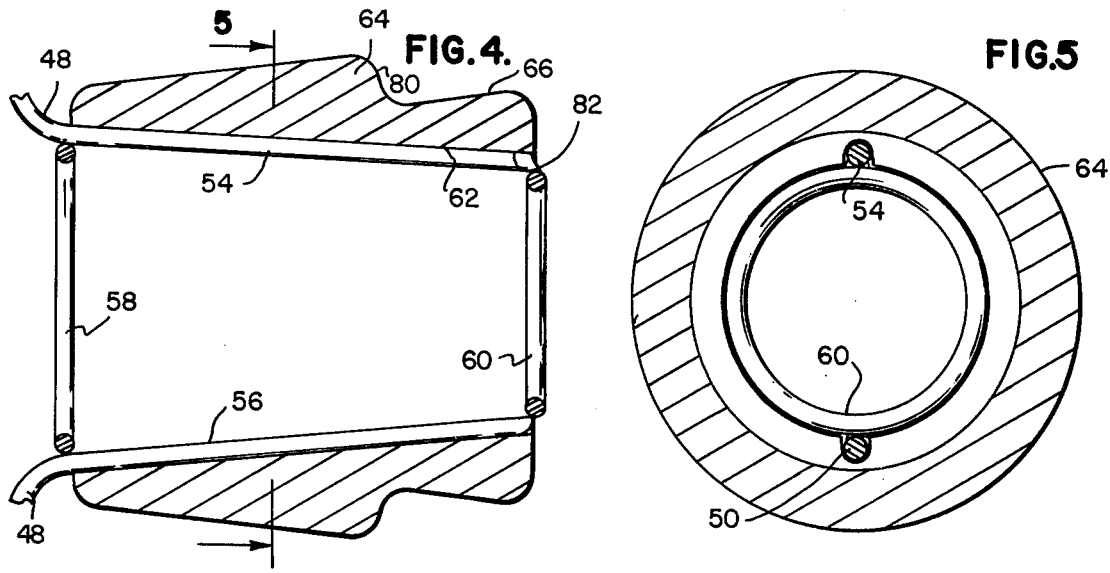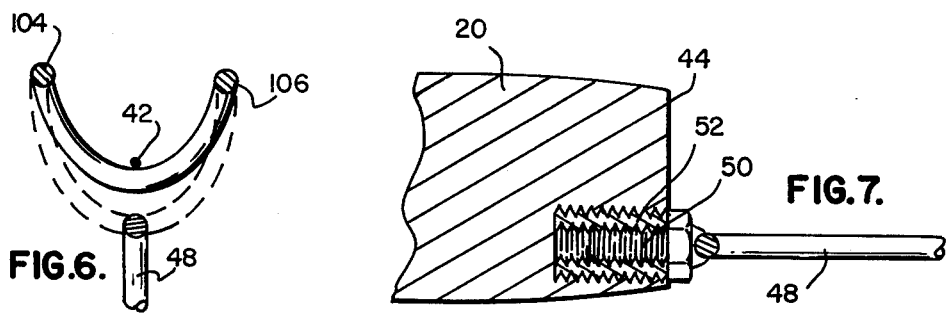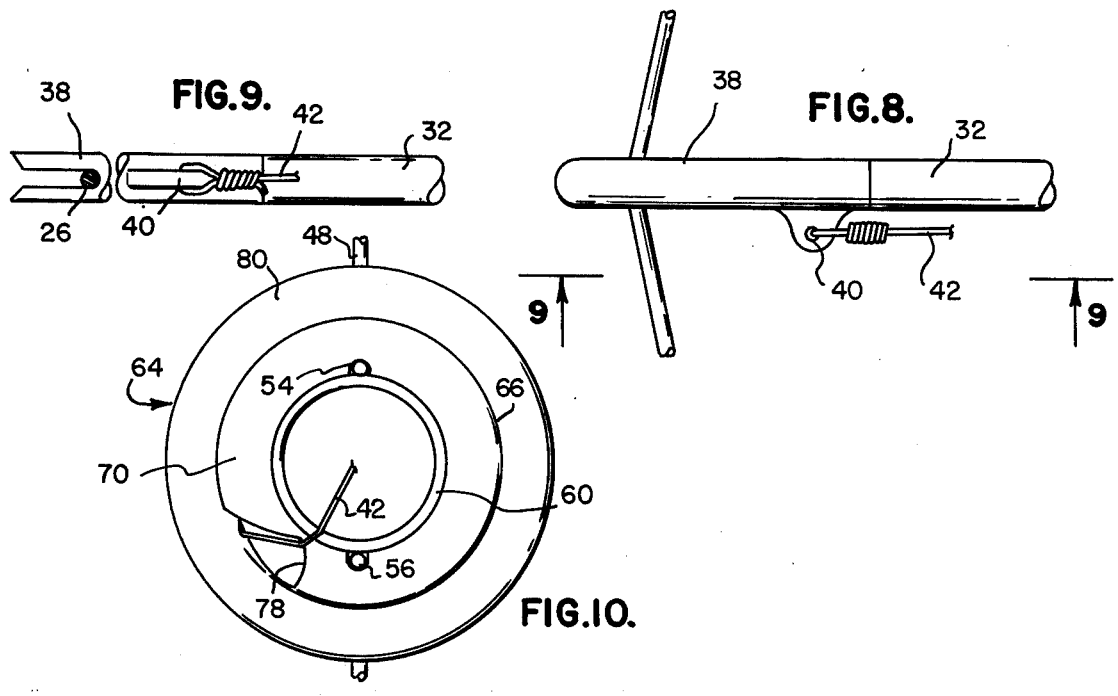

FISHING REEL AND SUPPORT FOR ARCHERY BOWS

BACKGROUND OF THE INVENTION

Various archery bow fishing reels have been attached to archery bows and have usually included simple spools upon which line is manually wound and such that the line may be dispensed from said spools in a similar manner to that of an open face spinning reel or the like. However, such prior art devices have lacked the necessary features to provided for the use of a spinning reel in combination with an axial spool for optionally dispensing line during the shooting of an arrow from the spinning reel or from the spinning spool which is independent of a spinning reel.

Various prior art devices have been incapable of mounting any conventional fishing reel to an archery bow and therefore many of the prior art devices do not afford the convenience of utilizing any reel which may be taken from a fishing pole for alternate use on an archery bow.

SUMMARY OF THE INVENTION

The present invention comprises a novel archery bow fishing reel and mount wherein a U-shaped frame member is fixed to an archery bow in a removeable manner and wherein the frame of the invention is generally loop shaped and mounts any one of several fishing reels therein such as to dispense line in a forward direction relative to the bow. The frame of the invention comprises loop shaped line guides on the forward portion thereof through which line may be dispensed from the fishing reel supported by the frame and the loop shaped line guides are surrounded by a line dispensing spool of hollow cylindrical shape which is disposed in surrounding relation with loop shaped line guides. The frame has means by which line may be guided between its emergence from the hollow open end of the spool to a connection with the arrow when in shooting position relative to a bow. The invention comprises a novel combination of a winding fishing reel together with an axial spinning spool on which line may be wound after it has been dispensed from the aforementioned reel so as to provide great versatility and optional use of the invention as may be required for various archery fishing operations.

The aforementioned spool of the invention is of hollow light weight material and is sufficiently bouyant to bouyantly support a reel and the frame of the invention in the event the same becomes displaced from an archery bow to which it has been connected.

The archery bow fishing reel means of the invention comprises a novel spool having a bore aligned in a forward and rearward axis with relationship to the frame of the invention and a bow to which it is connected. The hollow cylindrical structure of the spool is such that it is provided with a solid end having a smooth radius therearound and a notch in the radius end such as to hold line at one peripheral position so that a coil of line may be readily wound around the spool after being dispensed from the line winding reel of the invention and preliminary to the shooting of an arrow to which the coil is attached whereby the coil is readily and easily axially dispensed from the spool when the arrow moves toward its target.

Accordingly, it is an object of the invention to provide a very efficient and very versatile archery bow fishing reel and mount which is capable of great versatility in the use of various types of reels such as open face spinning reels, closed face spinning reels and other wind reels; the invention comprising an offset mount which may be offset to various positions depending upon the particular reel which it may be desired to use and the invention is thus very versatile in that a fishing reel may readily be moved from a fishing pole and readily connected to the mount in the archery bow fishing reel mount structure.

Another object of the invention is to provide a very efficient combination of a line winding fishing reel and an axial spool for various fishing operations so as to permit the use of the winding reel for direction dispensation through a guide means when an arrow is shot at the target and also to use the axial spool of the invention as an alternate method of dispensing a coil of line when the arrow is shot to its target.

Another object of the invention is to provide a bouyant spool structure which is capable of floating the reel supporting frame and the fishing reel in the event the reel supporting frame becomes displaced from the archery bow or in the event the archery bow and the reel frame are both dropped in the water whereby the bouyancy of the line holding spool of the invention in combination with the bouyancy of the archery bow provides for total floatation of the entire assembly of the bow, the reel supporting frame, together with the bouyant spool of the invention. Accordingly, the invention provides a safety factor in the event that a person is fishing from a boat and the bow reacts and falls from the archer's hand into the water. Thus, the bow cannot be sunk by the weight of the reel frame and the fishing reel attached thereto.

Another object of the invention is to provide an archery bow fishing reel and mount which is very handy in operation during times when an arrow is anchored in a large fish and it is desired to reel the fish in toward the archer, who holds the bow with one hand and operates the line winding reel of the invention with the other hand.

Further objects and advantages of the invention may be apparent from the following specification, appended claims and accompanying drawings.

BRIEF DESCRIPTION OF THE DRAWINGS

FIG. 1 is a side elevational view of an archery bow and arrow with the archery bow fishing reel and mount structure all in assembly and ready for archery fishing and showing a person's hand supporting the bow;

FIG. 2 is a side elevational view showing a fragmentary portion of the archery bow and showing the fishing reel and mount structure inverted and supporting a level wind reel as compared to the opern face spinning reel disclosed in FIG. 1 of the drawings;

FIG. 3 is another view similar to FIG. 2 but showing line anchored to the reel mount in the frame of the invention and showing a coil of line wound around the spool of the invention and extending backwardly in a direction to accomodate attachment with an arrow to be shot by the archery bow as shown in FIG. 1 of the drawings;

FIG. 4 is an enlarged fragmentary sectional view taken from the line 4—4 of FIG. 1;

FIG. 5 is a sectional view taken from the line 5—5 of FIG. 4;

FIG. 6 is an enlarged fragmentary sectional view taken from the line 6—6 of FIG. 2;

FIG. 7 is an enlarged fragmentary sectional view taken from the line 7—7 of FIG. 1;

FIG. 8 is a side elevational view of the nock end of an arrow to which a fishing line is secured;

FIG. 9 is a fragmentary sectional view taken from the line 9—9 of FIG. 8; and

FIG. 10 is a front elevational view of the line dispensing spool of the invention taken from the line 10—10 of FIG. 3.

DESCRIPTION OF THE PREFERRED EMBODIMENTS

As shown in FIG. 1 of the drawings, an archery bow 20 is provided with limbs 22 and 24 to which a bow string 26 is connected. The bow is provided with a conventional intermediate handle portion 28 adapted to be held in a hand 30 of an archer. An arrow 32 is shown in position to be drawn to flex the limbs 22 and 24 by retracting the bow string 26. The arrow 32 is provided with a rearward end 34 and a point end or forward end 36. The rear end 34 of the arrow 32 carries a nock 38 shown in FIGS. 8 and 9 of the drawings. This nock 38 has a line connection portion 40 to which fishing line 42 is connected.

The archery bow 20 is provided with a forward portion 44 facing a forward direction as indicated by an arrow 46.

Secured to the forward portion 44 of the bow is a reel holding frame 48 of the invention. This reel holding frame 48 is substantially loop shaped and, as shown in FIG. 7, is provided with an externally screwthreaded shank 50 screwthreaded in an internally screwthreaded bushing 52 imbedded in the forward portion 44 of the bow. Thus, the frame 48 is rigidly mounted on the forward portion 44 of the bow 20.

The generally loop shaped frame 48 is substantially circular in configuration as shown in FIG. 1 to 3 of the drawings. The term "generally loop shaped" shall be construed to means circular, rectangular, hexagonal or any other generally loop shaped configuration. As shown in FIG. 4 of the drawings, the forward extension of the loop shaped frame 48 comprises two rod portions 54 and 56 to which a pair of generally loop shaped line guides 58 and 60 are fixed. As shown in FIG. 5, these line guides 58 and 60 are preferably generally circular; the line guide 58 being slightly larger in diameter than the line guide 60; both line guides being disposed in slightly converging relation in a forward direction from the ring line guide 58 to the ring shaped line guide 60 and thus, the frame members 54 and 56 converge forming a generally wedge shaped converging forward portion which fits in an internal generally tapered bore 62 of a line holding and dispensing spool 64. This spool 64 is generally hollow and cylindrical and the tapered bore 62 may be wedged upon the generally converging frame members 54 and 56 in generally surrounding relation to the ring shaped or generally loop shaped line guides 58 and 60, shown best in FIGS. 4 and 5 of the drawings.

The spool 64, being hollow and cylindrical, is made of very bouyant material and is provided with a hard external surface inside the bore 62 and on the outer surfaces of the spool.

The spool is provided with a line coil receiving ledge portion 66 around which a coil 68 of the line 42 may be wound. The spool 66 is provided with a smooth radius annular open end portion 70 adjacent to the ring shaped line guides 60 such that the line 42 may extend from the reel mount 72 in the frame 48 or may extend from a reel 74 shown in FIG. 1 or a reel 76 shown in FIG. 2; the reel 74 and 76 being open face spinning reel mechanism and level wind reel mechanism respectively.

The spool 68 in the radiused end portion 70 is provided with a line holding notch 78, shown best in FIGS. 3 and 10 of the drawings, which provides holding means to permit the line to be held while it is wrapped around the coil holding ledge 66 into a coil such as shown in FIGS. 2 and 3 of the drawings. The coil holding ledge 66 has an adjacent shoulder 80 spaced from the open end 82 of the spool, all as shown best in FIGS. 1, 2, 3 and 4.

The frame 48 is provided with a reel mount comprising a pair of fixed bolts 84 and 86 on which the reel mount 72 is secured. The reel mount 72 is provided with offset portions 88 and 90 adjacent the bolts 84 and 86 so that the mount may be in either the position shown in FIG. 2 for supporting a level wind reel or may be reversed and disposed in the position shown in FIG. 1 for supporting an open faced spinning reel.

Conventional clamp fixtures 94 are disposed on the offset portion of the mount 72 for holding the usual mounting brackets of either an open faced spinning reel, a closed face spinning reel or a level wind reel, any one of which may be removed from a conventional fishing rod and directly connected to the mount 72 hereinbefore described.

Fixed to the upper portion of the loop shaped frame 48 is a generally U-shaped line guide 100, which as shown in FIG. 6 of the drawings, supports and guides the line 42 above the frame 48 as the line emerges from the peripheral edge 70 of the spool 64. The line guide 100 is fixed to the frame 48 at 102 by welding or any other suitable means and accordingly, when the bow string 26 is drawn, the line is drawn backward through the guide 48 between opposite upstanding portions 104 and 106 of the line guide, as shown in FIG. 6, so that when the arrow is released, the line may fly freely without becoming entangled with any of the mechanism of the frame or other structure and may proceed to be withdrawn, either directly through the line guides 58 and 60 from the reel 74 or may be drawn directly from the coil 68 hereinbefore described, which is wound around the ledge 66 of the spool 64 hereinbefore described.

In operation, the bow may become displaced from the archer's hand, and in the event the bow is lost over the side of a boat or the like, the combined bouyancy of the bow and of the bouyant spool 64 will bouyantly support the entire assembly in the water to thereby prevent the reel and frame from sinking the bow 20. It will also be understood that in the event the frame 48 becomes displaced from the bow 20 and falls in the water, the bouyancy of the spool 64 will support the frame and reel and prevent the same from sinking.

The frame 48 may be readily and screwthreadably connected or disconnected from the bow 20 by means of the screwthreaded structures 50 and 52 hereinbefore described in connection with FIG. 7 of the drawings.

The hollow cylindrical spool 64 is efficiently held on the extensions of the frame, namely the extensions 54 and 56 by wedging action since these frame extensions are forwardly converging and the bore 62 of the spool 64 is also conformingly converging.

It will be obvious to those skilled in the art that various modifications may be resorted to without departing from the spirit of the invention.

I claim:

1. An archery bow fishing reel and mount comprising: a frame adapted to be secured to the forward portion of an archery bow; first means for fixing said frame on said forward portion of an archery bow; said frame comprising a generally loop shaped structure having a rearward portion at which said means supports the same on said bow; a reel mount disposed in said generally loop shaped structure and adapted to support a line winding reel therein; said frame having a forward portion provided with second loop shaped strucutre; said second loop shaped structure disposed to receive fishing line therethrough from said line winding reel.

2. The invention as defined in claim 1, wherein: a hollow cylindrical spinning spool surrounds said second loop shaped structure and is supported thereon; said spool having a bore which is provided with an axis dispoed in a forward and rearward direction relative to said frame; said bore adapted to receive said line therethrough; said spool having a forward open end and a line receiving peripheral portion disposed rearwardly from said open end, whereby line may be dispensed from said line winding reel and may be wound around said line receiving peripheral portion in a readily dispensable coil whereby said line at its end may extend in a rearward direction from said coil to an attachment with an arrow in shooting position with respect to said archery bow.

3. The invention as defined in claim 2, wherein: said spool, at its forward open portion, is provided with a line engaging notch so as to provide a line holding means when line from said winding reel is being wound around said spool to form a dispensable coil thereon.

4. The invention as defined in claim 2, wherein: said spool is of light weight bouyant material adapted to float in water and to bouyantly support said frame and said line winding reel.

5. The invention as defined in claim 2, wherein: a generally U-shaped line guide is supported on said frame in a position rearward relative to said spool for engagement with line extending rearwardly from said spool to an attachment with an arrow in shooting position relative to said bow.

6. The invention as defined in claim 1, wherein: said generally loop shaped structure of said frame surrounds said reel mount; said reel mount being offset relative to said second loop shaped structure so as to support a reel in aligned position to dispense line through said second loop shaped structure; said mount having adjustable reel support means adapted to vary the offset position thereof so as to readily support various spinning reels as well as level wind reels in said aligned position.

7. The invention as defined in claim 1, wherein: said generally loop shaped structure of said frame is provided with a pair of forwardly extending portions; and said second loop shaped structure being fixed to said forwardly extending portions; said last mentioned loop shaped structure comprising a plurality of generally ring shaped members disposed in a forward and rearward spaced relation to each other.

8. The invention as defined in claim 7, wherein: a hollow cylindrical spinning spool surrounds said second loop shaped structure and is supported thereon; said spool having a bore which is provided with an axis disposed in a forward and rearward direction relative to said frame; said bore adapted to receive line therethrough; said spool having a forward open end and a line receiving peripheral portion disposed rearwardly from said open end, whereby line may be dispensed from said line winding reel and may be wound around said line receiving peripheral portion in a readily dispensable coil whereby said line at its end may extend in a rearward direction from said coil to an attachment with an arrow in shooting position with respect to said archery bow.

* * * * *